(12) United States Patent
Akiyama et al.

(10) Patent No.: US 12,055,499 B2
(45) Date of Patent: Aug. 6, 2024

(54) COMMUNICATION HOLE INSPECTION DEVICE AND COMMUNICATION HOLE INSPECTION METHOD

(71) Applicant: HONDA MOTOR CO., LTD., Tokyo (JP)

(72) Inventors: Ken Akiyama, Tokyo (JP); Satoshi Matsumoto, Tokyo (JP); Masato Yokemura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/281,852

(22) PCT Filed: Dec. 24, 2021

(86) PCT No.: PCT/JP2021/048164
§ 371 (c)(1),
(2) Date: Sep. 13, 2023

(87) PCT Pub. No.: WO2022/196021
PCT Pub. Date: Sep. 22, 2022

(65) Prior Publication Data
US 2024/0151654 A1    May 9, 2024

(30) Foreign Application Priority Data

Mar. 16, 2021 (JP) ................... 2021-042339

(51) Int. Cl.
*G01N 21/954*        (2006.01)
*B22C 19/00*         (2006.01)

(52) U.S. Cl.
CPC ........... *G01N 21/954* (2013.01); *B22C 19/00* (2013.01); *G01N 2021/9544* (2013.01); *G01N 2201/101* (2013.01)

(58) Field of Classification Search
CPC ......... G01N 21/954; G01N 2021/9544; G01N 2201/101; G01N 21/892; B22C 19/00; G01B 7/142
(Continued)

(56) References Cited

U.S. PATENT DOCUMENTS 6,879,404 B2 * 4/2005 Jagiella ................. G01B 7/142
356/614
7,325,326 B1 * 2/2008 Istre ..................... G01B 11/105
33/645
(Continued)

FOREIGN PATENT DOCUMENTS

CN     108204983 A    6/2018
CN     109313020 A    2/2019
(Continued)

OTHER PUBLICATIONS

PCT/ISA/210 from International Application PCT/JP2021/048164 with the English translation thereof.
(Continued)

*Primary Examiner* — Isiaka O Akanbi
(74) *Attorney, Agent, or Firm* — Carrier, Shende & Associates P.C.; Fulchand P. Shende; Joseph P. Carrier

(57) ABSTRACT

A communication hole inspection device for inspecting a communication hole in a structure, a casting surface being formed on an inner surface of the hole, said communication hole inspection device having: a light-emitting body that is arranged in a portion of the communication hole and emits a beam of light; a light-receiving body that is arranged in a different portion of the communication hole and receives the light beam from the light-emitting body; a rotation mechanism for changing the rotation angle of the light-emitting body and thereby changing the light beam received by the light-receiving body; and a determination unit for determining the open state of the communication hole at least on the (Continued)

basis of based on the light beam received by the light-receiving body when the rotation angle of the light-emitting body is set at a first angle, and at a second angle different from the first angle.

12 Claims, 12 Drawing Sheets

(58) Field of Classification Search
USPC ..... 356/241.1–241.5, 237.1–237.6, 614–623
See application file for complete search history.

(56) References Cited

U.S. PATENT DOCUMENTS

| | | | |
|---|---|---|---|
| 2005/0041241 A1* | 2/2005 | Pahk | G01B 11/08 356/237.1 |
| 2005/0046829 A1* | 3/2005 | Clark | G01N 21/47 356/237.1 |
| 2013/0014574 A1 | 1/2013 | Balog et al. | |
| 2015/0010435 A1* | 1/2015 | Matsumoto | G01N 35/00693 422/67 |
| 2017/0151643 A1* | 6/2017 | Ficken | B23Q 17/2495 |
| 2018/0174319 A1 | 6/2018 | Yang et al. | |
| 2019/0271536 A1 | 9/2019 | Haas | |
| 2019/0360945 A1* | 11/2019 | Paton | G01N 21/8806 |
| 2023/0280284 A1* | 9/2023 | Nygaard | G01B 11/24 356/241.1 |

FOREIGN PATENT DOCUMENTS

| | | |
|---|---|---|
| JP | H09-159417 A | 6/1997 |
| JP | H09-161042 A | 6/1997 |
| JP | H09-161057 A | 6/1997 |
| JP | 2001-317918 A | 11/2001 |
| JP | 3406872 B2 | 5/2003 |
| JP | 2004-028771 A | 1/2004 |
| JP | 2004-191135 A | 7/2004 |
| JP | 2010-276391 A | 12/2010 |
| JP | 2012-047534 A | 3/2012 |
| JP | 5455128 B2 | 3/2014 |
| JP | 2017-049102 A | 3/2017 |

OTHER PUBLICATIONS

Taiwanese Office Action dated Oct. 20, 2022 issued over the corresponding TW Patent Application 111105301 with the English translation thereof.

Chinese Office Action dated May 22, 2024, issued in the corresponding CN Patent Application No. 202180095763.7 with the English machine translation thereof.

* cited by examiner

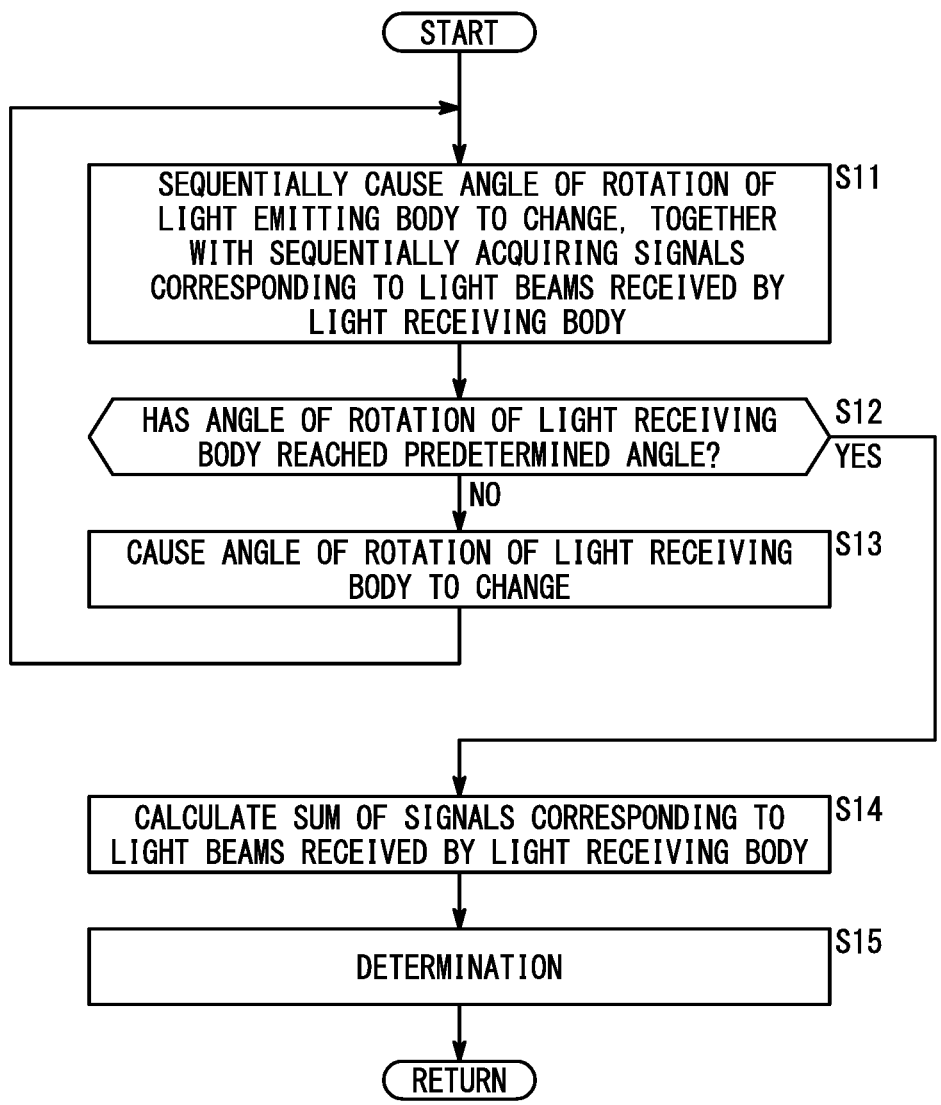

COMMUNICATION HOLE INSPECTION DEVICE AND COMMUNICATION HOLE INSPECTION METHOD

TECHNICAL FIELD

The present invention relates to a communication hole inspection device and a communication hole inspection method.

BACKGROUND ART

In the interior of a cylinder head or the like of an automobile engine, flow paths through which cooling water passes are laid out in a complicated manner. The cylinder head or the like is a cast product. Therefore, such flow paths are formed by placing a core in a mold. At the time of casting, there are cases in which the core may break or collapse. In such a case, clogging, constriction, or the like of the flow paths occurs. When clogging or constriction occurs in the flow paths, the cooling water will not flow adequately, resulting in insufficient cooling. Such an insufficiency in cooling can bring about an engine failure such as overheating or the like. Therefore, after having carried out casting of the cylinder head or the like, an inspection with respect to all of the flow paths provided in the cylinder head or the like is carried out.

In complicated flow paths such as curved flow paths or the like, clogging, constriction, and the like are likely to occur. For this reason, with respect to such complicated flow paths, for example, a wire or the like is manually passed through the flow paths to carry out a determination as to whether the flow paths are good or bad. Since the inspection by such a method requires a long time, it becomes a hindrance to reduction of costs or the like. Thus, techniques for performing an inspection of such flow paths based on wind speed (JP 3406872 B2, JP 2010-276391 A) and the like have been proposed.

SUMMARY OF THE INVENTION

However, the techniques described above are not capable of inspecting the communication holes satisfactorily in all cases.

An object of the present invention is to provide a communication hole inspection device and a communication hole inspection method that are capable of inspecting communication holes in a satisfactory manner.

A communication hole inspection device according to one aspect of the present invention is characterized by a communication hole inspection device configured to inspect a communication hole of a structural body having a casting surface formed on an inner surface thereof, the communication hole inspection device comprising a light emitting body arranged in a portion of the communication hole and configured to emit a light beam, a light receiving body arranged in a different portion of the communication hole and configured to receive the light beam, a rotation mechanism configured to change the light beam received by the light receiving body by changing an angle of rotation of the light emitting body, and a determination unit configured to determine an open state of the communication hole, based at least on the light beam received by the light receiving body when the angle of rotation of the light emitting body is set to a first angle, and the light beam received by the light receiving body when the angle of rotation of the light emitting body is set to a second angle of rotation that differs from the first angle of rotation.

A communication hole inspection method according to another aspect of the present invention is characterized by a communication hole inspection method for inspecting a communication hole of a structural body having a casting surface formed on an inner surface thereof, the communication hole inspection method comprising a receiving step of receiving a light beam emitted from a light emitting body arranged in a portion of the communication hole by a light receiving body arranged in another portion of the communication hole, a changing step of changing the light beam received by the light receiving body by changing an angle of rotation of the light emitting body, and a determination step of determining an open state of the communication hole, based at least on the light beam received by the light receiving body when the angle of rotation of the light emitting body is set to a first angle, and the light beam received by the light receiving body when the angle of rotation of the light emitting body is set to a second angle of rotation that differs from the first angle of rotation.

According to the present invention, a communication hole inspection device and a communication hole inspection method can be provided, which are capable of inspecting communication holes in a satisfactory manner.

BRIEF DESCRIPTION OF THE DRAWINGS

FIG. 12 is a flow chart showing operations of the communication hole inspection device according to the second embodiment.

DETAILED DESCRIPTION OF THE INVENTION

A communication hole inspection device and a communication hole inspection method according to the present invention will be presented and described in detail below with reference to the accompanying drawings.

First Embodiment

Figure 1:
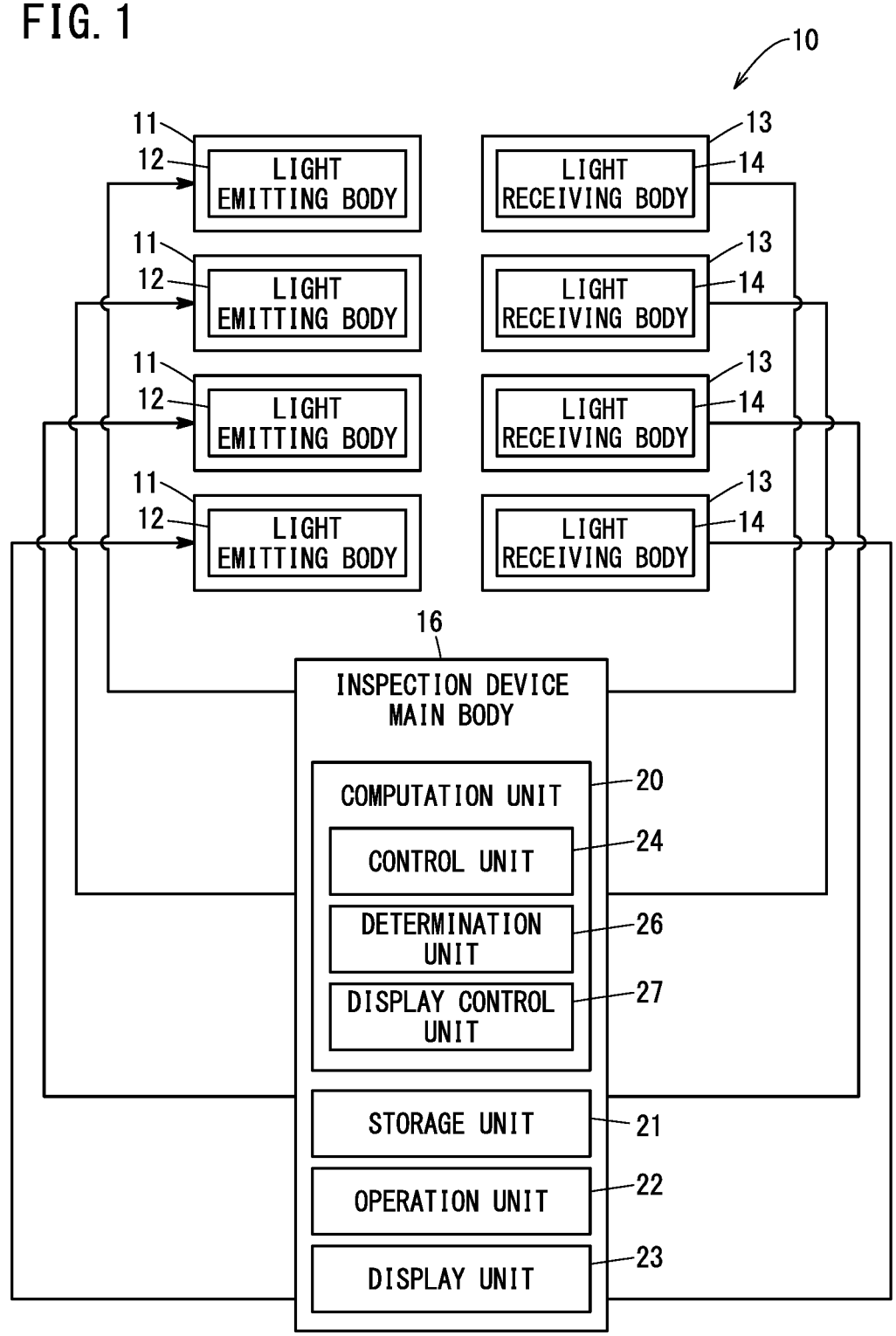
FIG. 1 is a block diagram showing a portion of a communication hole inspection device according to a first embodiment.
Figure 2:
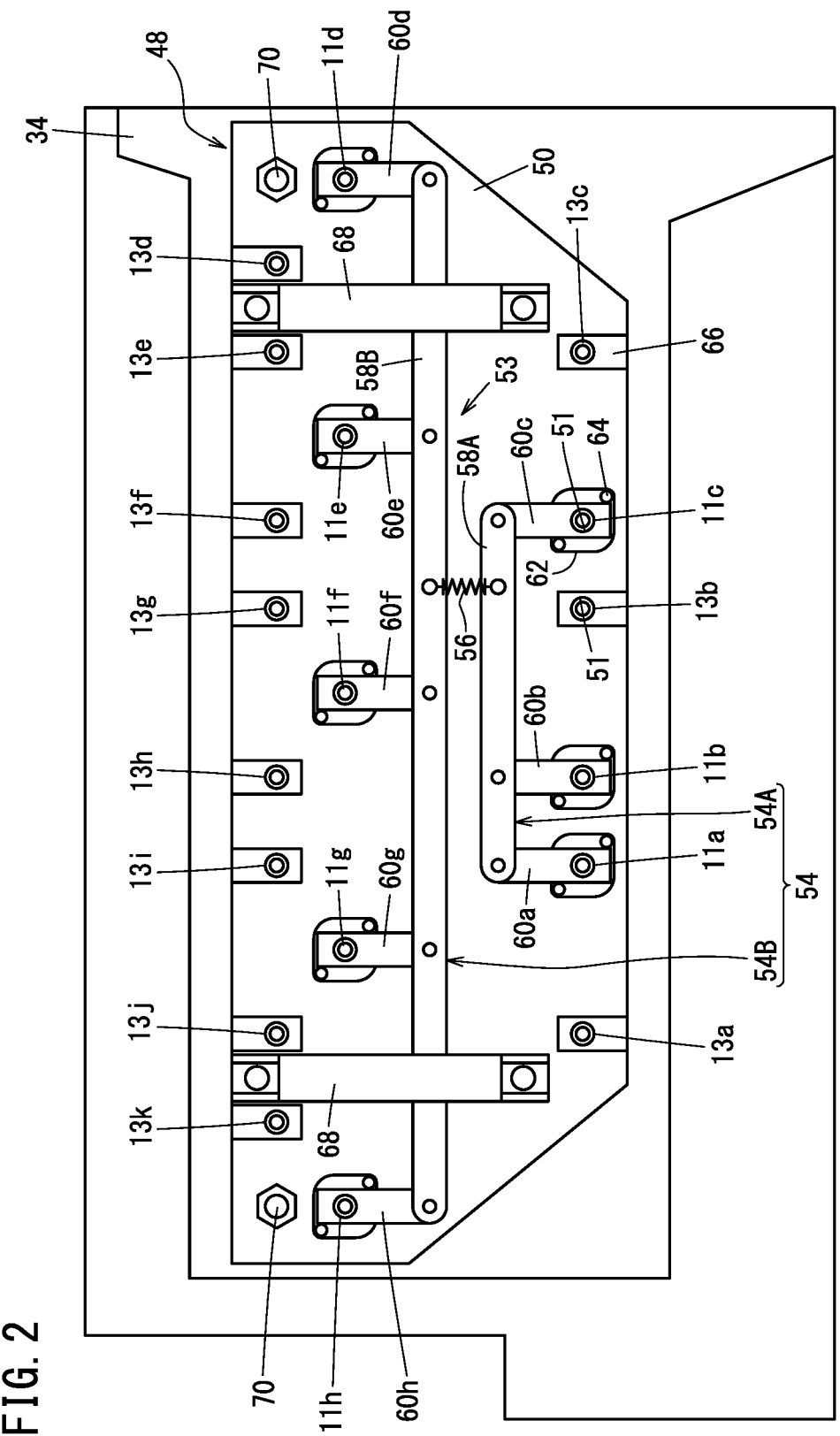
FIG. 2 is a diagram showing a state in which an inspection jig is installed on a structural body that serves as an object to be inspected.

The communication hole detection device and the communication hole detection method according to a first embodiment will be described with reference to the accompanying drawings. FIG. 1 is a block diagram showing a portion of a communication hole inspection device according to a first embodiment. FIG. 2 is a diagram showing a state in which an inspection jig is installed on a structural body that serves as an object to be inspected.

As shown in FIG. 1, a communication hole inspection device 10 may be provided with an inspection device main body 16. The communication hole inspection device 10 may further be equipped with an inspection jig 48 (refer to FIG. 2). As shown in FIG. 1, the communication hole inspection device 10 may further be equipped with a plurality of light emitting modules 11, and a plurality of light receiving modules 13. The light emitting modules 11 and the light receiving modules 13 can be provided on the inspection jig 48 (refer to FIG. 2). Further, although eight of the light emitting modules 11a to 11h (refer to FIG. 2) may be provided on the inspection jig 48, in FIG. 1, only four of the light emitting modules 11 are illustrated. Further, although eleven of the light receiving modules 13a to 13k (refer to FIG. 2) may be provided on the inspection jig 48, in FIG. 1, only four of the light receiving modules 13 are illustrated. Moreover, reference numeral 11 is used when describing the light emitting modules in general, and reference numerals 11a to 11h are used when describing individual ones of the light emitting modules. Further, reference numeral 13 is used when describing the light receiving modules in general, and reference numerals 13a to 13k are used when describing individual ones of the light receiving modules.

Figure 3:
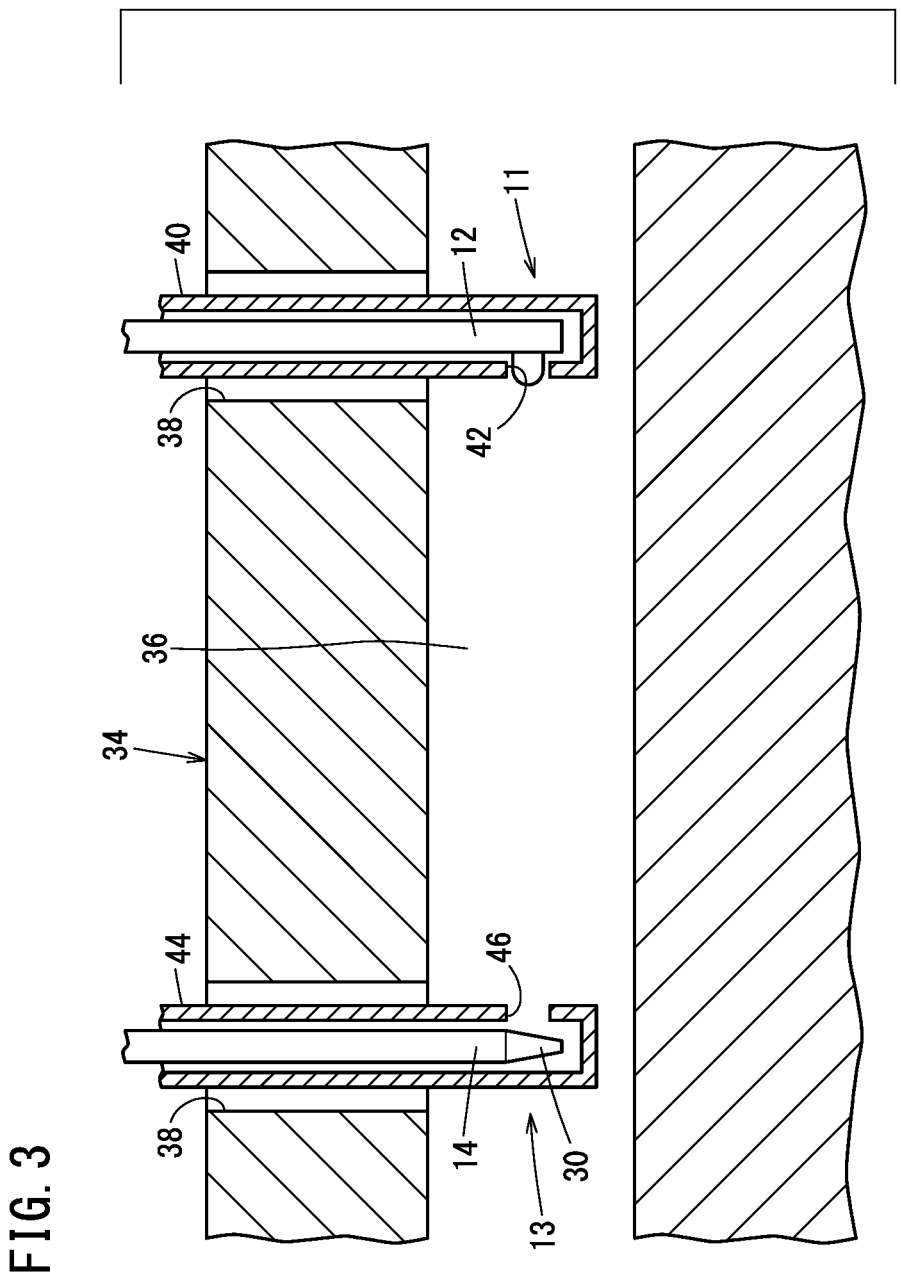
FIG. 3 is a diagram illustrating an example of arranging a light emitting module and a light receiving module.

FIG. 3 is a diagram illustrating an example of arranging the light emitting modules and the light receiving modules. As shown in FIG. 3, communication holes 36 can be formed in a structural body 34 that serves as an object to be inspected. Openings 38 that are formed in the structural body 34 are in communication with the communication holes 36. The light emitting modules 11 can be arranged in ones of the openings 38 of the structural body 34. The light receiving modules 13 can be arranged in openings 38 that differ from the openings 38 in which the light emitting modules 11 are arranged. Stated otherwise, the light emitting modules 11 can be arranged in a portion of the communication holes 36. The light receiving modules 13 can be arranged in another portion of the communication holes 36. Reference numeral 38 is used when describing the openings in general. Reference numerals 38a to 38o are used when describing individual ones of the openings.

The light emitting module 11, and more specifically, a light projecting module, may be equipped with a non-illustrated amplifier and a light emitting body 12. The light emitting body 12 may emit a light beam. As the light emitting body 12, for example, a light emitting diode (LED: Light Emitting Diode) can be used, however, the present embodiment is not limited to this feature. The light emitting diode may be a light emitting diode that emits visible light, or a light emitting diode that emits infrared light. The light emitting module 11 may be equipped with a protective tube 40 that protects the light emitting module 11. As the material of the protective tube 40, for example, a material having a light shielding property can be used. The protective tube 40 may be equipped with an opening 42 therein for emitting the light emitted from the light emitting body 12 to the exterior. The light emitting body 12 is capable of emitting light in accordance with control signals supplied from the inspection device main body 16.

Each of the light receiving module 13 may be equipped with a light receiving body 14 having a light receiving surface (an omnidirectional light receiving surface) 30, a non-illustrated amplifier, and a non-illustrated A/D converter. The light receiving module 13 may be equipped with a protective tube 44 that protects the light receiving module 13. As the material of the protective tube 44, for example, a material having a light shielding property can be used, however, the present embodiment is not limited to this feature. The protective tube 44 may be equipped with an opening 46 therein for receiving the light emitted from the light emitting body 12. The light receiving body 14 receives on the light receiving surface 30 the light emitted from the light emitting body 12, and guides the light that is received to a non-illustrated light receiving sensor. In this manner, the light receiving body 14 is capable of receiving the light emitted from the light emitting body 12. As the light receiving sensor, for example, a photodiode or the like can be used, although the present embodiment is not limited to this feature. The amplifier can amplify the signal obtained by the light receiving sensor. The A/D converter is capable of converting an analog signal obtained due to being amplified by the amplifier into a digital signal. The digital signal obtained in this manner can be supplied to the inspection device main body 16.

As shown in FIG. 1, the inspection device main body 16 may be equipped with a computation unit 20, a storage unit 21, an operation unit 22, and a display unit 23. The computation unit 20 may be configured by a processor such as a CPU (Central Processing Unit), a GPU (Graphics Processing Unit), or the like. More specifically, the computation unit 20 can be configured by a processing circuit (processing circuitry).

The computation unit 20 may be equipped with a control unit 24, a determination unit 26, and a display control unit 27. The control unit 24, the determination unit 26, and the display control unit 27 can be realized by programs stored in the storage unit 21 being executed by the computation unit 20.

At least a portion of the control unit 24, the determination unit 26, and the display control unit 27 may be realized by an integrated circuit such as an ASIC (Application Specific Integrated Circuit), an FPGA (Field-Programmable Gate Array), or the like. Further, at least a portion of the control unit 24, the determination unit 26, and the display control unit 27 may be configured by an electronic circuit including a discrete device.

The storage unit 21 may be configured by a non-illustrated volatile memory and a non-illustrated non-volatile memory. As the volatile memory, for example, there may be cited a RAM (Random Access Memory) or the like. As the non-volatile memory, for example, there may be cited a ROM (Read Only Memory) or a flash memory or the like. Data and the like may be stored, for example, in the volatile memory. Programs, tables, maps, etc., may be stored, for example, in the non-volatile memory. At least a portion of the storage unit 21 may be provided in the aforementioned processor or the aforementioned integrated circuit or the like.

The operation unit 22 can be used when a user (a person in charge of inspection) operates the inspection device main body 16. As the operation unit 22, there can be cited a keyboard, a mouse, and the like, although the present embodiment is not limited to this feature.

A non-illustrated display element is provided in the display unit 23. As such a display element, there may be used, for example, a liquid crystal display element, an organic electroluminescence display element, or the like. The operation unit 22 and the display unit 23 may be constituted by a non-illustrated touch panel that is equipped with such a display element.

Figure 4:
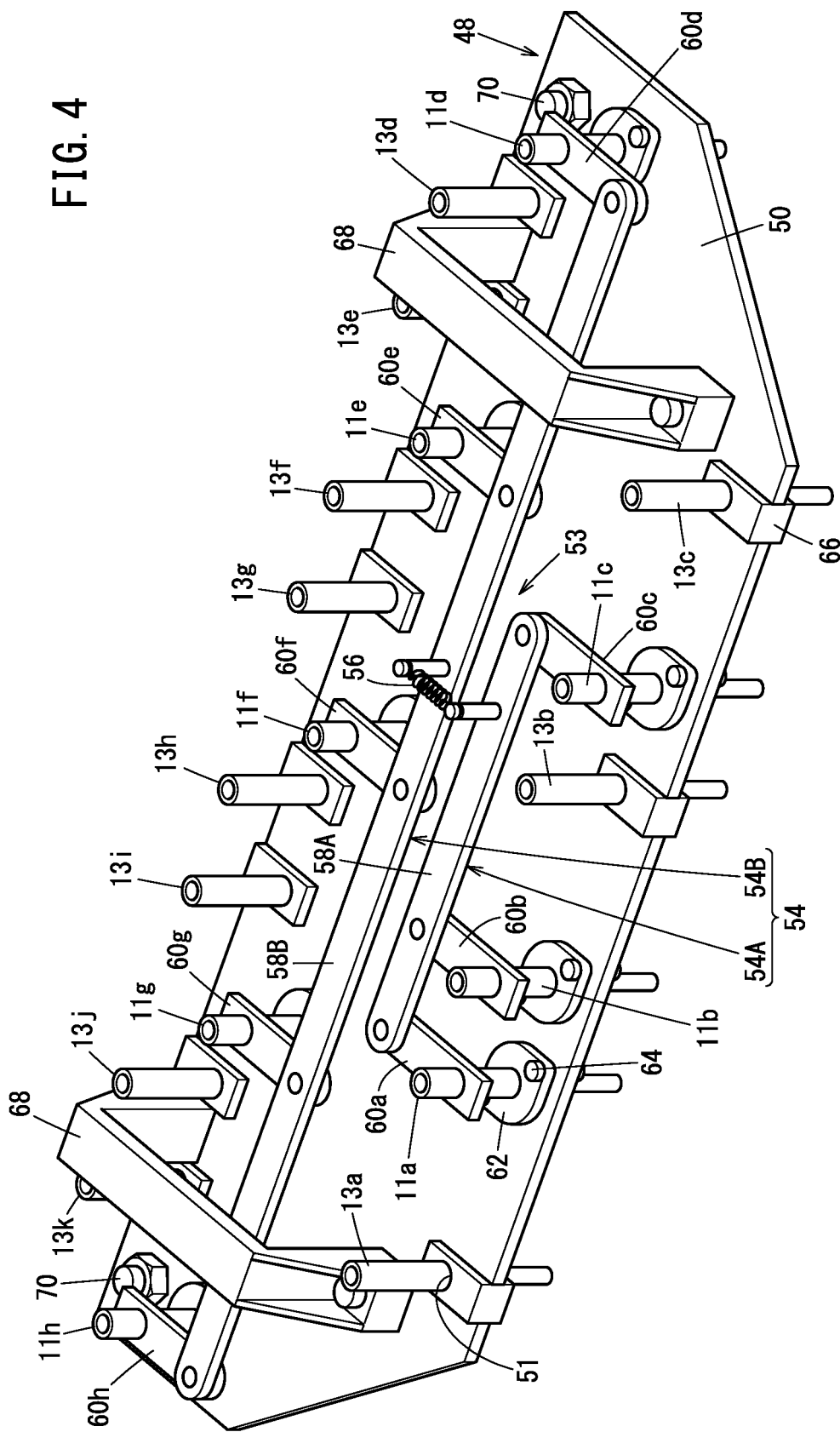
FIG. 4 is a perspective view showing the inspection jig.
Figure 5:
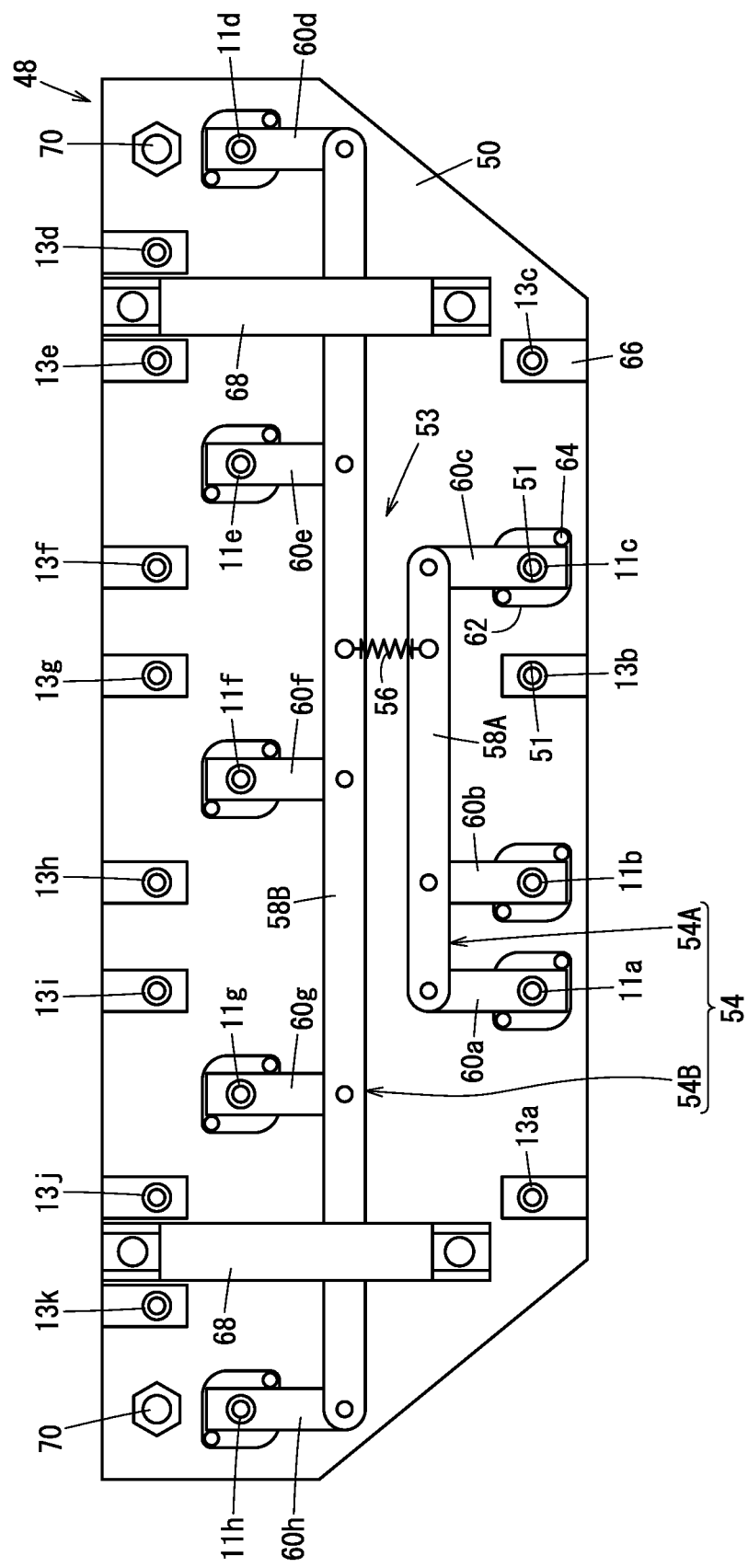
FIG. 5 is a plan view showing the inspection jig.

FIG. 4 is a perspective view showing the inspection jig. FIG. 5 is a plan view showing the inspection jig. As shown in FIG. 4 and FIG. 5, the inspection jig 48 may be equipped with a plate 50. A plurality of through holes 51 may be formed in the plate 50. The through holes 51 may be formed in a manner so as to correspond with the openings 38 that are formed in the structural body 34. The light emitting modules 11a to 11h and the light receiving modules 13a to 13k are capable of being inserted respectively into the plurality of the through holes 51.

As noted previously, each of the light emitting modules 11 may be provided with the protective tube 40 (refer to FIG. 3). A non-illustrated bearing may be installed on the protective tube 40. The bearing may be accommodated within a bearing holder 62. The bearing holder 62 may be secured to the plate 50 by a fastening member 64. A bolt and a nut may be used as the fastening member 64, however, the present embodiment is not limited to this feature.

As noted previously, each of the light receiving modules 13 may be provided with the protective tube 44 (refer to FIG. 3). The protective tube 44 may be fixed to the plate 50 by a fixing member 66.

A rotation mechanism 53 for rotating the light emitting modules 11 may be provided on the inspection jig 48. The above-described bearing and the bearing holder 62 are capable of constituting a portion of the rotation mechanism 53.

A link mechanism 54 for collectively rotating the plurality of the light emitting modules 11 may be provided on the inspection jig 48. The link mechanism 54 is capable of constituting a portion of the rotation mechanism 53.

A partial link mechanism 54A and a partial link mechanism 54B are provided on the link mechanism 54. The partial link mechanism 54A is equipped with a framework member 58A. The partial link mechanism 54B is equipped with a framework member 58B. The longitudinal direction of the framework member 58A lies along the longitudinal direction of the plate 50. Further, the longitudinal direction of the framework member 58B also lies along the longitudinal direction of the plate 50. Reference numeral 58 is used when describing the framework members in general. Reference numerals 58A and 58B are used when describing individual ones of the framework members. The partial link mechanism 54A is further equipped with link members 60a to 60c. One end sides of the link members 60a to 60c are fixed to each of the light emitting modules 11a to 11c. Other end sides of the link members 60a to 60c are rotatably supported by the framework member 58A. The partial link mechanism 54B is further equipped with link members 60d to 60h. One end sides of the link members 60d to 60h are fixed to each of the light emitting modules 11d to 11h. Other end sides of the link members 60d to 60h are rotatably supported by the framework member 58B. The framework member 58A and the framework member 58B are joined together by a spring 56.

When the framework members 58 that make up portions of the link mechanism 54 are slid in the longitudinal direction of the framework members 58, the angle of rotation (light projecting angle) of the light emitting modules 11 changes. When the angle of rotation of the light emitting modules 11 is changed, the angle of rotation (light projecting angle) of the light emitting body 12 provided in the light emitting modules 11 changes. When the angle of rotation of the light emitting body 12 changes, the light beam received by the light receiving body 14 changes. Specifically, when the angle of rotation of the light emitting body 12 changes, the light beam received by the light receiving body 14 changes.

The inspection jig 48 may further be equipped with handles 68. The handles 68 may be attached respectively to one longitudinal side and another longitudinal side of the plate 50. The handles 68 can be used when the inspection jig 48 is attached to and detached from the structural body 34 by the user.

The inspection jig 48 may further be equipped with positioning pins 70. The positioning pins 70 serve to carry out positioning (i.e., alignment) between the inspection jig 48 and the structural body 34. For example, two of the positioning pins 70 may be provided on the inspection jig 48. When the inspection jig 48 is installed on the structural body 34, the positioning pins 70 can be inserted into positioning holes 72 (refer to FIG. 6) that are formed in the structural body 34.

Figure 6:
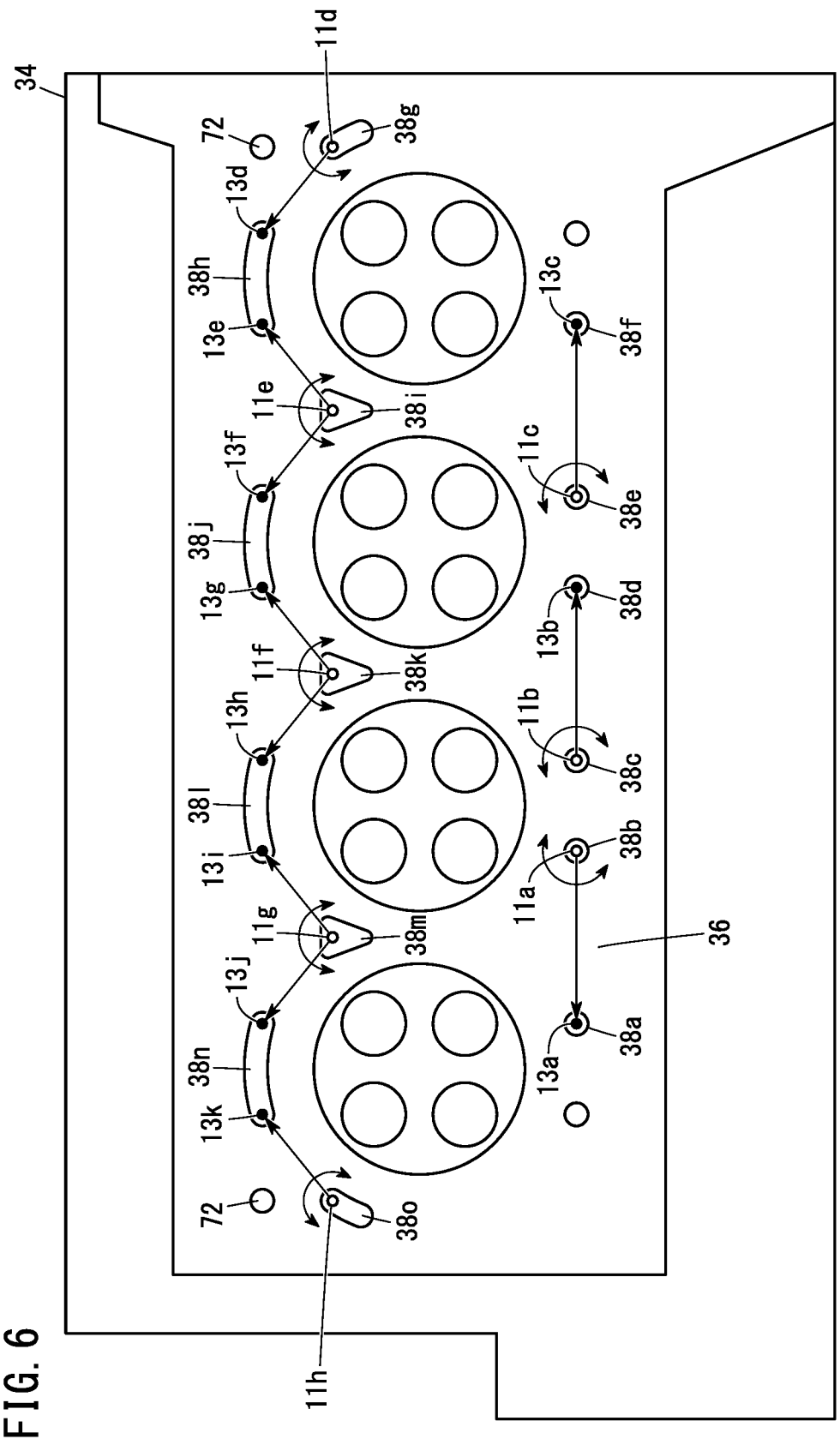
FIG. 6 is a plan view showing an example of a structural body serving as an object to be inspected.

FIG. 6 is a plan view showing an example of a structural body serving as an object to be inspected. In this instance, an example will be described of a case in which the structural body (a casting) 34 to be inspected is a cylinder head, which makes up one portion of an automobile engine. However, the present embodiment is not necessarily limited to this feature. In FIG. 6, a state is shown in which the inspection jig 48 (refer to FIG. 4) is installed on the structural body 34. However, in FIG. 6, in order to avoid complexity, illustration of the plate 50, the link mechanism 54, and the like is omitted.

As shown in FIG. 6, in the interior of the structural body 34, communication holes (flow paths) 36 through which cooling water is passed are arranged in a complicated manner. Specifically, the water jacket is intricately stretched out in the interior of the structural body 34. A plurality of the communication holes 36 are present in the interior of the structural body 34. In this instance, an exemplary case will be described in which the communication holes 36 for allowing the cooling water to pass therethrough are communication holes to be inspected (flow paths to be inspected), however, the present embodiment is not limited to this feature. The inner surfaces (wall surfaces) of the communication holes 36 are formed by a casting surface. Openings (communication openings) 38a to 38o are provided in the structural body 34. Reference numeral 38 is used when describing the openings in general. Reference numerals 38a to 38o are used when describing individual ones of the openings.

The light emitting module 11a can be arranged in the opening 38b. The light receiving module 13a can be arranged in the opening 38a. The light receiving module 13a receives light emitted from the light emitting module 11a that is arranged in the opening 38b. The light emitting module 11b can be arranged in the opening 38c. The light receiving module 13b can be arranged in the opening 38d. The light receiving module 13b receives light emitted from the light emitting module 11b that is arranged in the opening 38c. The light emitting module 11c can be arranged in the opening 38e. The light receiving module 13c can be arranged in the opening 38f. The light receiving module 13c receives light emitted from the light emitting module 11c that is arranged in the opening 38e.

The light emitting module 11d can be arranged in the opening 38g. The light receiving module 13d can be arranged in the opening 38h. The light receiving module 13d receives light emitted from the light emitting module 11d that is arranged in the opening 38g. The light emitting module 11e is arranged in the opening 38i. The light receiving module 13e can further be arranged in the opening 38h. The light receiving module 13e receives light emitted from the light emitting module 11e that is arranged in the opening 38i. The light receiving module 13f can be arranged in the opening 38j. The light receiving module 13f receives light emitted from the light emitting module 11e that is arranged in the opening 38i. The light emitting module 11f can be arranged in the opening 38k. The light receiving module 13g can further be arranged in the opening 38j. The light receiving module 13g receives light emitted from the light emitting module 11f that is arranged in the opening 38k. The light receiving module 13h can further be arranged in the opening 38l. The light receiving module 13h receives light emitted from the light emitting module 11f that is arranged in the opening 38k. The light emitting module 11g can be arranged in the opening 38m. The light receiving module 13i can further be arranged in the opening 38l. The light receiving module 13i receives light emitted from the light emitting module 11g that is arranged in the opening 38m. The light receiving module 13j can be arranged in the opening 38n. The light receiving module 13j receives light emitted from the light emitting module 11g that is arranged in the opening 38m. The light emitting module 11h can be arranged in the opening 38o. The light receiving module 13k can be arranged in the opening 38n. The light receiving module 13k receives light emitted from the light emitting module 11h that is arranged in the opening 38o.

In this manner, the light emitting modules 11 can be arranged in one portion of the communication holes 36. Stated otherwise, the light emitting bodies 12 can be arranged in one portion of the communication holes 36. Further, the light receiving modules 13 can be arranged in another portion of the communication holes 36. Stated otherwise, the light receiving bodies 14 can be arranged in another portion of the communication holes 36. The light emitting body 12 and the light receiving body 14 can be arranged with respect to each of the plurality of communication holes 36.

The light emitted from the light emitting module 11a can be received by the light receiving module 13a. The light emitted from the light emitting module 11b can be received by the light receiving module 13b. The light emitted from the light emitting module 11c can be received by the light receiving module 13c. The light emitted from the light emitting module 11d can be received by the light receiving module 13d. The light emitted from the light emitting module 11h can be received by the light receiving module 13k. More specifically, in these instances, one of the light receiving bodies 14 is provided with respect to one of the light emitting bodies 12.

The light receiving modules 13e and 13f can receive the light emitted from the light emitting module 11e. The light receiving modules 13g and 13h can receive the light emitted from the light emitting module 11f. The light receiving modules 13i and 13j can receive the light emitted from the light emitting module 11g. More specifically, in these instances, a plurality of the light receiving bodies 14 are provided with respect to one of the light emitting bodies 12.

The light emitting modules 11 are capable of respectively irradiating the interiors of the communication holes 36 with predetermined light beams. The light receiving modules 13 can receive the light beams emitted from the light emitting modules 11. The light beams received by the light receiving modules 13 can include not only the light beams that directly reach the light receiving modules 13 from the light emitting modules 11, but also the light beams reflected on the inner surfaces of the communication holes 36 after having been emitted from the light emitting modules 11. Even in the case that the communication holes 36 are curved, a certain amount of the light beams is capable of reaching the light receiving modules 13.

The control unit 24 is capable of controlling the light emitting modules 11 and the light receiving modules 13. Specifically, the control unit 24 can appropriately supply control signals to the light emitting modules 11a to 11h. The light emitting body 12 provided in the light emitting modules 11 is capable of emitting light in accordance with the control signals supplied from the control unit 24. The light emitted from the light emitting bodies 12 provided in the light emitting modules 11 passes through the communication holes 36, and is capable of reaching the light receiving modules 13. The light that has reached the light receiving modules 13 is received by the light receiving bodies 14. The light received by the light receiving body 14 is capable of reaching a non-illustrated light receiving sensor. The light receiving sensor outputs a signal corresponding to the amount of light that is incident on the light receiving surface of the light receiving sensor. The signal output from the light receiving sensor is amplified by an amplifier. The signal having been amplified by the amplifier is converted into a digital signal by an A/D converter. The digital signal output from the A/D converter is input to the inspection device main body 16. In this manner, control signals are appropriately supplied to the light emitting modules 11a to 11h, and the signals obtained by the light receiving modules 13a to 13k can be input to the inspection device main body 16.

When the light emitting module 11a is caused to emit light, the signal obtained by the light receiving module 13a is used. When the light emitting module 11b is caused to emit light, the signal obtained by the light receiving module 13b is used. When the light emitting module 11c is caused to emit light, the signal obtained by the light receiving module 13c is used. When the light emitting module 11d is caused to emit light, the signal obtained by the light receiving module 13d is used. When the light emitting module 11e is caused to emit light, the signals obtained by the light receiving modules 13e and 13f are used. When the light emitting module 11f is caused to emit light, the signals obtained by the light receiving modules 13g and 13h are used. When the light emitting module 11g is caused to emit light, the signals obtained by the light receiving modules 13i and 13j are used. When the light emitting module 11h is caused to emit light, the signal obtained by the light receiving module 13k is used. Each of the plurality of signals obtained in this manner reflects the state of each of the plurality of the communication holes 36.

When the framework members 58 that make up portions of the link mechanism 54 slide to one side in the longitudinal direction of the framework members 58, the angle of rotation of the light emitting body 12, for example, can be set to the first angle. The first angle, for example, can be set to an angle such that the light emitted from the light emitting body 12 may not sufficiently reach the light receiving body 14. The determination unit 26 is capable of determining, based on the signals supplied from the light receiving modules 13, the light beams received by the light receiving body 14 when the angle of rotation of the light emitting body 12 is set to the first angle. When the framework members 58 that make up portions of the link mechanism 54 slide to the other side in the longitudinal direction of the framework members 58, the angle of rotation of the light emitting body 12, for example, can be set to the second angle. The second angle, for example, can be set to an angle such that the light emitted from the light emitting body 12 is capable of sufficiently reaching the light receiving body 14. The determination unit 26 is capable of determining, based on the signals supplied from the light receiving modules 13, the light beams received by the light receiving body 14 when the angle of rotation of the light emitting body 12 is set to the second angle. The determination unit 26 can determine the open state of the communication holes 36, based at least on the light beams received by the light receiving body 14 when the angle of rotation of the light emitting body 12 is set to the first angle, and the light beams received by the light receiving body 14 when the angle of rotation of the light emitting body 12 is set to the second angle of rotation, which is different from the first angle. For example, in the case that the difference between the light beams received by the light receiving body 14 when the angle of rotation of the light emitting body 12 is set to the first angle, and the light beams received by the light receiving body 14 when the angle of rotation of the light emitting body 12 is set to the second angle of rotation is sufficiently large, the determination unit 26 can determine that the communication holes 36 are sufficiently opened. In the case that the difference between the light beams received by the light receiving body 14 when the angle of rotation of the light emitting body 12 is set to the first angle, and the light beams received by the light receiving body 14 when the angle of rotation of the light emitting body 12 is set to the second angle of rotation is greater than or equal to the threshold value, the determination unit 26 can determine that the communication holes 36 are sufficiently opened. In the case that the difference between the light beams received by the light receiving body 14 when the angle of rotation of the light emitting body 12 is set to the first angle, and the light beams received by the light receiving body 14 when the angle of rotation of the light emitting body 12 is set to the second angle of rotation is not sufficiently large, the determination unit 26 can determine that the communication holes 36 are not sufficiently opened. In the case that the difference between the light beams received by the light receiving body 14 when the angle of rotation of the light emitting body 12 is set to the first angle, and the light beams received by the light receiving body 14 when the angle of rotation of the light emitting body 12 is set to the second angle of rotation is less than the threshold value, the determination unit 26 can determine that the communication holes 36 are not sufficiently opened.

The display control unit 27 administers the control of the display of the display unit 23. The display control unit 27 is capable of displaying on a non-illustrated display screen of the display unit 23 the determination results or the like determined by the determination unit 26.

In this manner, the communication hole inspection device 10 according to the present embodiment is constituted.

Figure 7:
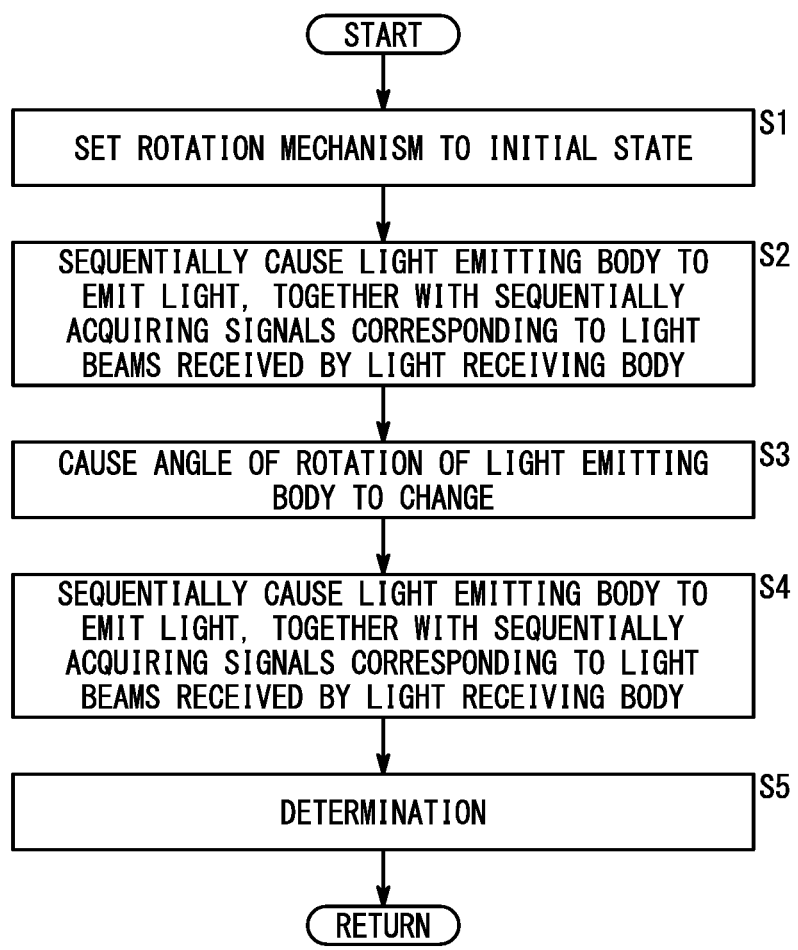
FIG. 7 is a flow chart showing operations of the communication hole inspection device according to the first embodiment.

Next, a description will be given with reference to FIG. 7 concerning operations of the communication hole inspection device 10 according to the present embodiment. FIG. 7 is a flow chart showing operations of the communication hole inspection device according to the present embodiment.

In step S1, the user, and more specifically the person in charge of the inspection sets the rotation mechanism 53 to an initial state. For example, the rotation mechanism 53 can be set to the initial state by causing the framework members 58 that make up portions of the link mechanism 54 to slide to one side in the longitudinal direction of the framework members 58. The angle of rotation of the light emitting body 12 provided in the light emitting module 11a is set, for example, to an angle in a manner so that the light emitted from the light emitting body 12 cannot sufficiently reach the light receiving body 14 provided in the light receiving module 13a. The angle of rotation of the light emitting body 12 provided in the light emitting module 11b is set, for example, to an angle in a manner so that the light emitted from the light emitting body 12 cannot sufficiently reach the light receiving body 14 provided in the light receiving module 13b. The angle of rotation of the light emitting body 12 provided in the light emitting module 11c is set, for example, to an angle in a manner so that the light emitted from the light emitting body 12 cannot sufficiently reach the light receiving body 14 provided in the light receiving module 13c. The angle of rotation of the light emitting body 12 provided in the light emitting module 11d is set, for example, to an angle in a manner so that the light emitted from the light emitting body 12 cannot sufficiently reach the light receiving body 14 provided in the light receiving module 13d. The angle of rotation of the light emitting body 12 provided in the light emitting module 11e can be set in the following manner. More specifically, for example, the angle can be set in a manner so that although the light emitted from the light emitting body 12 cannot sufficiently reach the light receiving body 14 provided in the light receiving module 13e, the light emitted from the light emitting body 12 can sufficiently reach the light receiving body 14 provided in the light receiving module 13f. The angle of rotation of the light emitting body 12 provided in the light emitting module 11f can be set in the following manner. More specifically, for example, the angle can be set in a manner so that although the light emitted from the light emitting body 12 cannot sufficiently reach the light receiving body 14 provided in the light receiving module 13g, the light emitted from the light emitting body 12 can sufficiently reach the light receiving body 14 provided in the light receiving module 13h. The angle of rotation of the light emitting body 12 provided in the light emitting module 11g can be set in the following manner. More specifically, for example, the angle can be set in a manner so that although the light emitted from the light emitting body 12 cannot sufficiently reach the light receiving body 14 provided in the light receiving module 13i, the light emitted from the light emitting body 12 can sufficiently reach the light receiving body 14 provided in the light receiving module 13j. The angle of rotation of the light emitting body 12 provided in the light emitting module 11h is set, for example, to an angle in a manner so that the light emitted from the light emitting body 12 cannot sufficiently reach the light receiving body 14 provided in the light receiving module 13k. Moreover, in this instance, an exemplary case has been described in which the user sets the rotation mechanism 53 to the initial state. However, the rotation mechanism 53 may be set to the initial state by a robot or the like. Thereafter, the process transitions to step S2.

In step S2, the control unit 24 sequentially causes the light emitting bodies 12 to emit light, together with sequentially acquiring signals corresponding to the light beams received by the light receiving bodies 14. Specifically, the control unit 24 sequentially causes the light emitting bodies 12 to emit light, and sequentially acquires signals corresponding to the light beams received by the light receiving bodies 14. More specifically, the control unit 24 causes the light emitting body 12 provided in the light emitting module 11a to emit light, and acquires a signal corresponding to the light beam received by the light receiving body 14 provided in the light receiving module 13a. Next, the control unit 24 causes the light emitting body 12 provided in the light emitting module 11b to emit light, and acquires a signal corresponding to the light beam received by the light receiving body 14 provided in the light receiving module 13b. Next, the control unit 24 causes the light emitting body 12 provided in the light emitting module 11c to emit light, and acquires a signal corresponding to the light beam received by the light receiving body 14 provided in the light receiving module 13c. Next, the control unit 24 causes the light emitting body 12 provided in the light emitting module 11d to emit light. In addition, the control unit 24 acquires a signal corresponding to the light beam received by the light receiving body 14 provided in the light receiving module 13d. Next, the control unit 24 causes the light emitting body 12 provided in the light emitting module 11e to emit light. In addition, the control unit 24 acquires a signal corresponding to the light beam received by the light receiving body 14 provided in the light receiving module 13e, and a signal corresponding to the light beam received by the light receiving body 14 provided in the light receiving module 13f. Next, the control unit 24 causes the light emitting body 12 provided in the light emitting module 11f to emit light. In addition, the control unit 24 acquires a signal corresponding to the light beam received by the light receiving body 14 provided in the light receiving module 13g, and a signal corresponding to the light beam received by the light receiving body 14 provided in the light receiving module 13h. Next, the control unit 24 causes the light emitting body 12 provided in the light emitting module 11g to emit light. In addition, the control unit 24 acquires a signal corresponding to the light beam received by the light receiving body 14 provided in the light receiving module 13i, and a signal corresponding to the light beam received by the light receiving body 14 provided in the light receiving module 13j. Next, the control unit 24 causes the light emitting body 12 provided in the light emitting module 11h to emit light, and acquires a signal corresponding to the light beam received by the light receiving body 14 provided in the light receiving module 13k. Thereafter, the process transitions to step S3.

In step S3, the user operates the rotation mechanism 53 to cause the angle of rotation of the light emitting body 12 to change. For example, the user changes the angle of rotation by causing the framework members 58 that make up portions of the link mechanism 54 to slide to the other side in the longitudinal direction of the framework members 58. The angle of rotation of the light emitting body 12 provided in the light emitting module 11a can be set, for example, to an angle in a manner so that the light emitted from the light emitting body 12 can sufficiently reach the light receiving body 14 provided in the light receiving module 13a. The angle of rotation of the light emitting body 12 provided in the light emitting module 11b is set, for example, to an angle in a manner so that the light emitted from the light emitting body 12 can sufficiently reach the light receiving body 14 provided in the light receiving module 13b. The angle of rotation of the light emitting body 12 provided in the light emitting module 11c is set, for example, to an angle in a manner so that the light emitted from the light emitting body 12 can sufficiently reach the light receiving body 14 provided in the light receiving module 13c. The angle of rotation of the light emitting body 12 provided in the light emitting module 11d is set, for example, to an angle in a manner so that the light emitted from the light emitting body 12 can sufficiently reach the light receiving body 14 provided in the light receiving module 13d. The angle of rotation of the light emitting body 12 provided in the light emitting module 11e can be set in the following manner. More specifically, for example, the angle can be set in a manner so that although the light emitted from the light emitting body 12 can sufficiently reach the light receiving body 14 provided in the light receiving module 13e, the light emitted from the light emitting body 12 cannot sufficiently reach the light receiving body 14 provided in the light receiving module 13f. The angle of rotation of the light emitting body 12 provided in the light emitting module 11f can be set in the following manner. More specifically, for example, the angle can be set in a manner so that although the light emitted from the light emitting body 12 can sufficiently reach the light receiving body 14 provided in the light receiving module 13g, the light emitted from the light emitting body 12 cannot sufficiently reach the light receiving body 14 provided in the light receiving module 13h. The angle of rotation of the light emitting body 12 provided in the light emitting module 11g can be set in the following manner. More specifically, for example, the angle can be set in a manner so that although the light emitted from the light emitting body 12 can sufficiently reach the light receiving body 14 provided in the light receiving module 13i, the light emitted from the light emitting body 12 cannot sufficiently reach the light receiving body 14 provided in the light receiving module 13j. The angle of rotation of the light emitting body 12 provided in the light emitting module 11h is set, for example, to an angle in a manner so that the light emitted from the light emitting body 12 can sufficiently reach the light receiving body 14 provided in the light receiving module 13k. Moreover, in this instance, an exemplary case has been described in which the user operates the rotation mechanism 53. However, the rotation mechanism 53 may be operated by a robot or the like. Thereafter, the process transitions to step S4.

In step S4, similar to step S2, the control unit 24 sequentially causes the light emitting bodies 12 to emit light, together with sequentially acquiring signals corresponding to the light beams received by the light receiving bodies 14. Thereafter, the process transitions to step S5.

In step S5, the determination unit 26 determines the open state of the communication holes 36, based on the signals obtained in step S2, and the signals obtained in step S4. For example, in the case that the difference between the signals corresponding to the light beams received by the light receiving body 14 in step S2, and the signals corresponding to the light beams received by the light receiving body 14 in step S4 is sufficiently large, the determination unit 26 is capable of determining that the communication holes 36 are sufficiently opened. In the case that the difference between the signals corresponding to the light beams received by the light receiving body 14 in step S2, and the signals corresponding to the light beams received by the light receiving body 14 in step S4 is greater than or equal to a predetermined threshold value, the determination unit 26 is capable of determining that the communication holes 36 are sufficiently opened. On the other hand, in the case that the difference between the signals corresponding to the light beams received by the light receiving body 14 in step S2, and the signals corresponding to the light beams received by the light receiving body 14 in step S4 is not sufficiently large, the determination unit 26 is capable of determining that the communication holes 36 are not sufficiently opened. In the case that the difference between the signals corresponding to the light beams received by the light receiving body 14 in step S2, and the signals corresponding to the light beams received by the light receiving body 14 in step S4 is less than the predetermined threshold value, the determination unit 26 is capable of determining that the communication holes 36 are not sufficiently opened. In this manner, the process shown in FIG. 7 is brought to an end.

In this manner, according to the present embodiment, the light emitting body 12 is arranged in a portion of the communication holes 36, and the light receiving body 14 is arranged in another portion of the communication holes 36. In addition, by the angle of rotation of the light emitting body 12 being forced to change by the rotation mechanism 53, the light beam received by the light receiving body 14 is made to change. Stated otherwise, the amount of light received by the light receiving body 14 is made to change by causing the light projecting angle of the light emitting body 12 to be changed by the rotation mechanism 53. In addition, the open state of the communication holes 36 is determined on the basis of the light beams received by the light receiving body 14 when the angle of rotation of the light emitting body 12 is set to the first angle, and the light beams received by the light receiving body 14 when the angle of rotation of the light emitting body 12 is set to the second angle of rotation. Stated otherwise, the open state of the communication holes 36 is determined based on the amount of light received by the light receiving body 14 when the light projecting angle of the light emitting body 12 is set to the first angle, and the amount of light received by the light receiving body 14 when the light projecting angle of the light emitting body 12 is set to the second angle. Accordingly, it is possible to provide the communication hole inspection device 10 that is capable of satisfactorily determining the open state of the communication holes 36.

Second Embodiment

The communication hole detection device and the communication hole detection method according to a second embodiment will be described with reference to the accompanying drawings.

In the first embodiment, the open state of the communication holes 36 is determined on the basis of the light beams received by the light receiving bodies 14 when the angle of rotation of the light emitting body 12 is set to the first angle, and the light beams received by the light receiving bodies 14 when the angle of rotation of the light emitting body 12 is set to the second angle of rotation. In the communication hole inspection device 10 according to the present embodiment, the light beams are sequentially received by the light receiving body 14 while the angle of rotation of the light emitting body 12 is sequentially changed, and the open state of the communication holes 36 is determined based on the light beams sequentially received by the light receiving body 14.

Figure 8A:
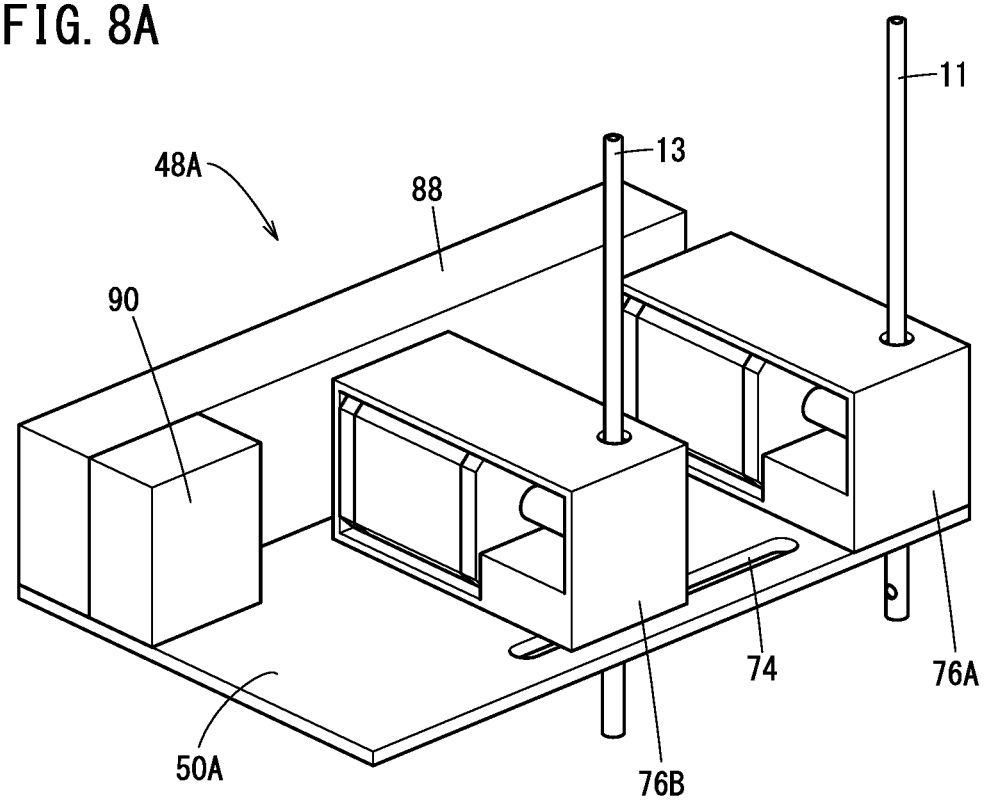
FIG. 8A and FIG. 8B are diagrams showing portions of a communication hole inspection device according to a second embodiment.
Figure 8B:
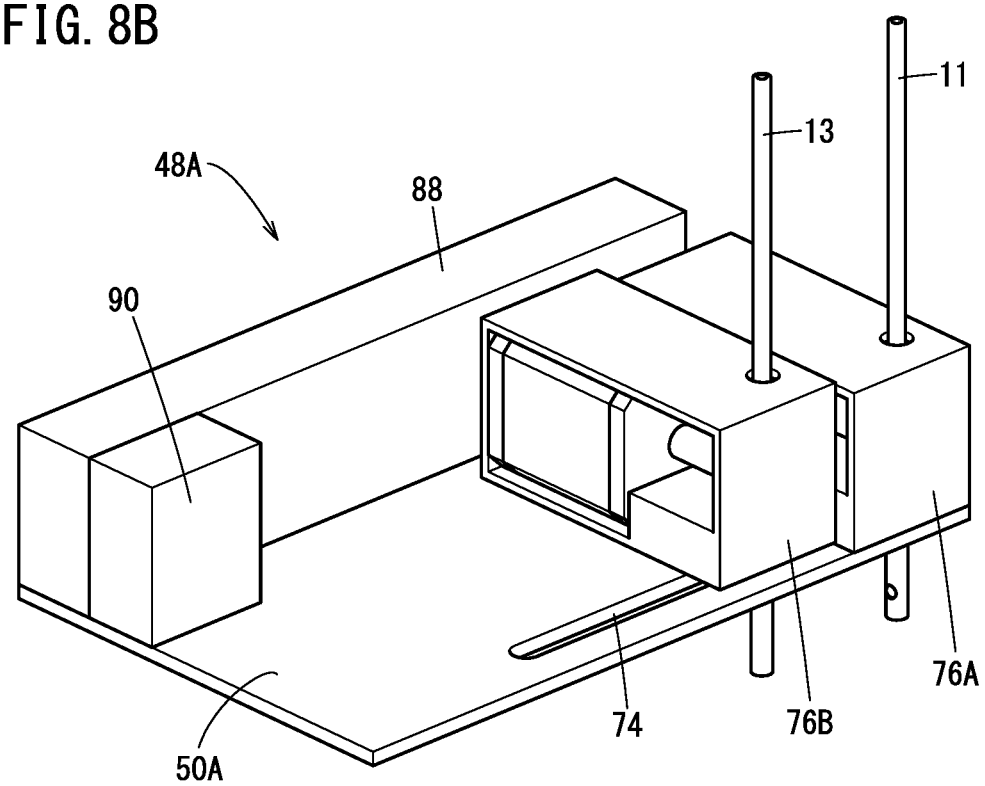

FIG. 8A and FIG. 8B are diagrams showing portions of a communication hole inspection device according to the present embodiment. In FIG. 8A and FIG. 8B, an inspection jig 48A, which is provided in the communication hole inspection device 10 according to the present embodiment, is shown.

As shown in FIG. 8A and FIG. 8B, the inspection jig 48A may be equipped with a plate 50A. A slit 74 is formed in the plate 50A. The slit 74 serves to enable the positions of the light emitting modules 11 and the light receiving modules 13 to be displaced. The longitudinal direction of the slit 74 lies along the longitudinal direction of the plate 50A.

Rotation mechanisms (turning mechanisms) 76A and 76B may be provided on the plate 50A. The rotation mechanism 76A serves to change the angle of rotation of the light emitting body 12. The rotation mechanism 76B serves to change the angle of rotation of the light receiving body 14. Reference numeral 76 is used when describing the rotation mechanisms in general. Reference numerals 76A and 76B are used when describing individual ones of the rotation mechanisms.

Figure 9:
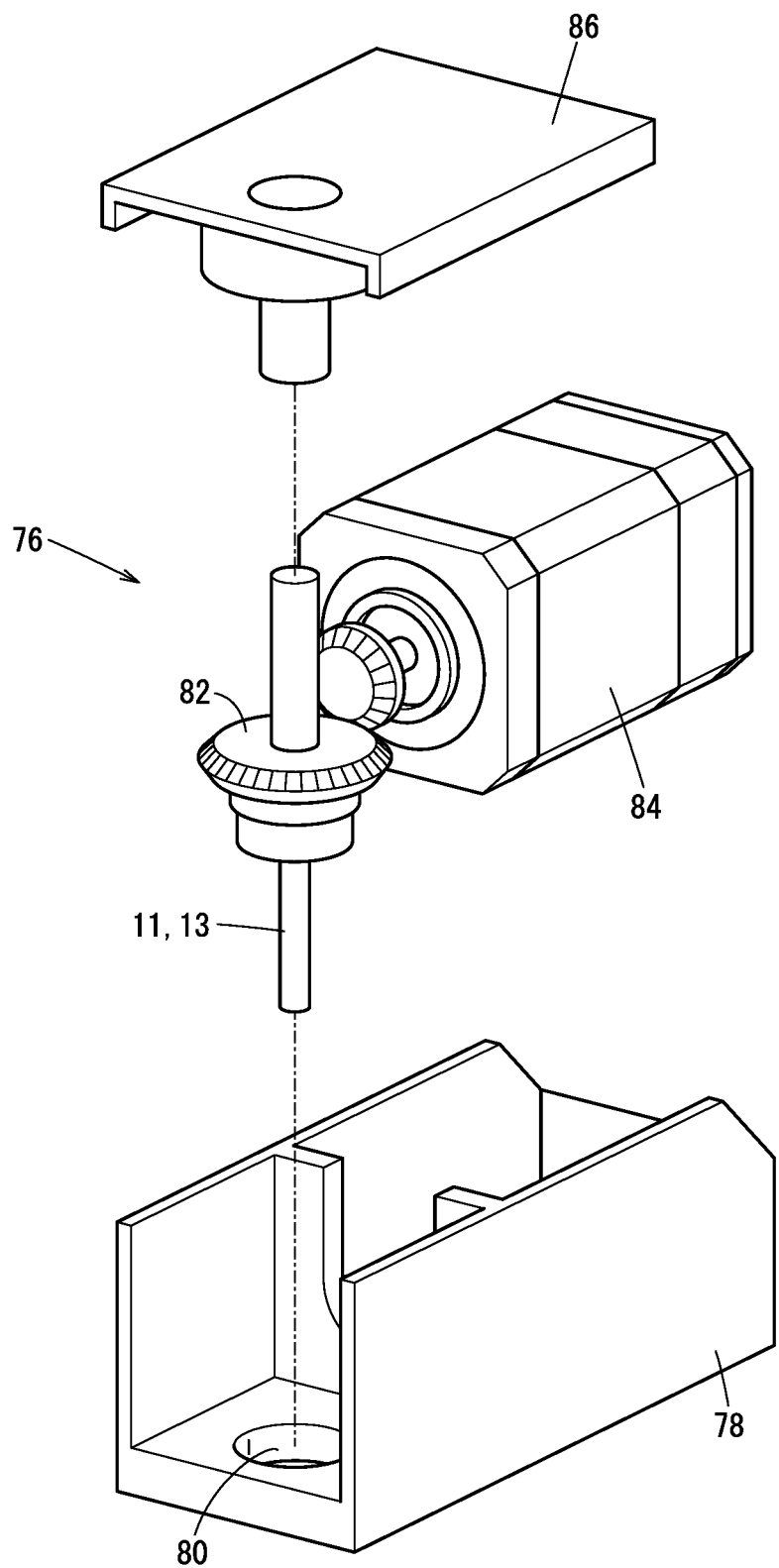
FIG. 9 is an exploded perspective view of a rotation mechanism.

FIG. 9 is an exploded perspective view of a rotation mechanism. As shown in FIG. 9, the rotation mechanisms 76 may be provided with a casing 78. An opening 80 is formed in the bottom surface of the casing 78. A rotating shaft 82 can be inserted into the opening 80. The rotating shaft 82 serves to rotate the light emitting modules 11 or the light receiving modules 13. The light emitting body 12 provided in the light emitting modules 11 can be pivotally supported on the rotating shaft 82. Further, the light receiving body 14 provided in the light receiving modules 13 can be pivotally supported on the rotating shaft 82. The rotation mechanisms 76 may further be provided with a driving body 84. The driving body 84 can be constituted, for example, by a stepping motor or the like. The driving body 84 is capable of causing the rotating shaft 82 to rotate. Based on a drive signal supplied from the control unit 24, the driving body 84 is capable of causing the rotating shaft 82 to rotate. The rotating shaft 82 and the driving body 84 may be accommodated within the casing 78. The rotation mechanisms 76 are further equipped with a lid portion 86. The lid portion 86 can be fixed to the casing 78, for example, by non-illustrated screws or the like.

As shown in FIG. 8A and FIG. 8B, the inspection jig 48A may be equipped with a slide mechanism 88 that causes the rotation mechanisms 76 to slide. The slide mechanism 88 may be provided with a driving device 90 for causing the rotation mechanisms 76 to slide. The driving device 90 is capable of causing the rotation mechanisms 76 to slide in the longitudinal direction of the plate 50A, based on a signal supplied from the control unit 24. By causing the rotation mechanisms 76 to slide, the distance between the light emitting modules 11 and the light receiving modules 13 can be made to change.

Figure 10A:
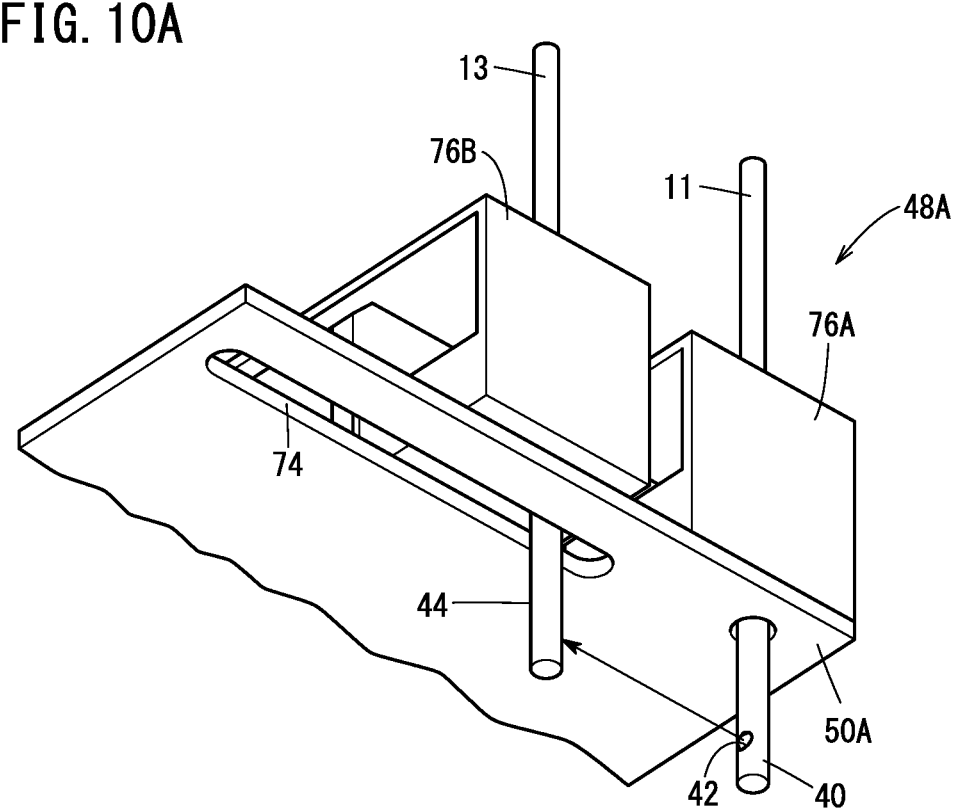
FIG. 10A and FIG. 10B are perspective views showing portions of the inspection jig.
Figure 10B:
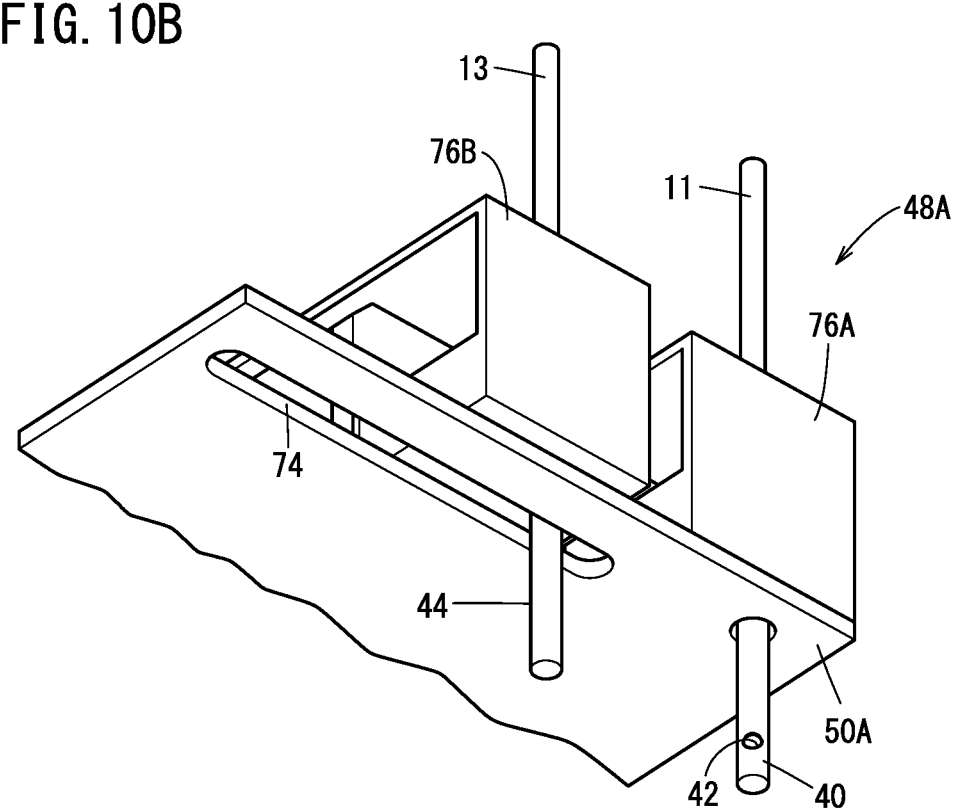

FIG. 10A and FIG. 10B are perspective views showing portions of the inspection jig. FIG. 10A and FIG. 10B show a state in which the inspection jig 48A is viewed obliquely from a lower side thereof.

As shown in FIG. 10A and FIG. 10B, the opening 42 is formed in the protective tube 40 provided for the light emitting module 11. Further, the opening 46 (refer to FIG. 3) is also formed in the protective tube 44 provided for the light receiving module 13. Since the protective tube 40 provided for the light emitting module 11 can be rotated by the rotation mechanism 76A, the direction or the orientation of the opening 42 provided in the protective tube 40 can also be changed. Further, since the protective tube 44 provided for the light receiving modules 13 can be rotated by the rotation mechanism 76B, the direction or the orientation of the opening 46 provided in the protective tube 44 can also be changed. The light beams received by the light receiving body 14 from the light emitting body 12 can be maximized when the following state is brought about. More specifically, the direction from the central axis of the protective tube 40 toward the opening 42 becomes the direction from the light emitting module 11 toward the light receiving module 13. Further, the direction from the central axis of the protective tube 44 toward the opening 46 becomes the direction from the light receiving module 13 toward the light emitting module 11. At such a time, the light beams received by the light receiving body 14 from the light emitting body 12 can be maximized. More specifically, when the opening 42 provided in the light emitting module 11 and the opening 46 provided in the light receiving module 13 face toward each other, the light beams from the light emitting body 12 which are received by the light receiving body 14 can be maximized. In a state in which the opening 42 provided in the light emitting module 11 and the opening 46 provided in the light receiving module 13 are not facing toward each other, the light beams from the light emitting body 12 which are received by the light receiving body 14 are reduced corresponding to the orientation of the openings 42 and 46. More specifically, in the state in which the opening 42 provided in the light emitting module 11 and the opening 46 provided in the light receiving module 13 do not face toward each other, the light beams from the light emitting body 12 which are received by the light receiving body 14 are reduced corresponding to the angle of rotation of the light emitting body 12 and the angle of rotation of the light receiving body 14.

When the open state of the communication holes 36 formed in the structural body 34 is inspected, the inspection jig 48A is capable of being installed on the structural body 34 in the following manner. More specifically, it is necessary for the light emitting modules 11 to be inserted into one of the openings 38 that communicates with a portion of the communication holes 36 that serves as the object to be inspected, and it is necessary for the light receiving modules 13 to be inserted into another portion of the openings 38 that communicate with another portion of the communication holes 36. Therefore, by the rotation mechanisms 76 being forced to slide using the slide mechanism 88, the distance between the one of the openings 38 and the other openings 38, and the distance between the light emitting modules 11 and the light receiving modules 13 can be made to coincide. The control with respect to the slide mechanism 88 may be carried out, for example, by the control unit 24. Thereafter, the inspection jig 48A is installed on the structural body 34, in a manner so that the light emitting modules 11 are inserted into the openings 38 that communicate with one portion of the communication holes 36, and together therewith, the light receiving modules 13 are inserted into the openings 38 that communicate with another portion of the communication holes 36. Installation of the inspection jig 48A to the structural body 34 may be carried out by the user, or may be carried out by a robot.

When the open state of the communication holes 36 formed in the structural body 34 is inspected, the light beams are sequentially received by the light receiving body 14 while the angle of rotation of the light emitting body 12 is sequentially changed by the rotation mechanism 76A. The determination unit 26 is capable of determining the open state of the communication holes 36 based on the light beams sequentially received by the light receiving body 14. More specifically, the determination unit 26 is capable of determining the open state of the communication holes 36 based on the sum of the light beams sequentially received by the light receiving body 14.

Figure 11:
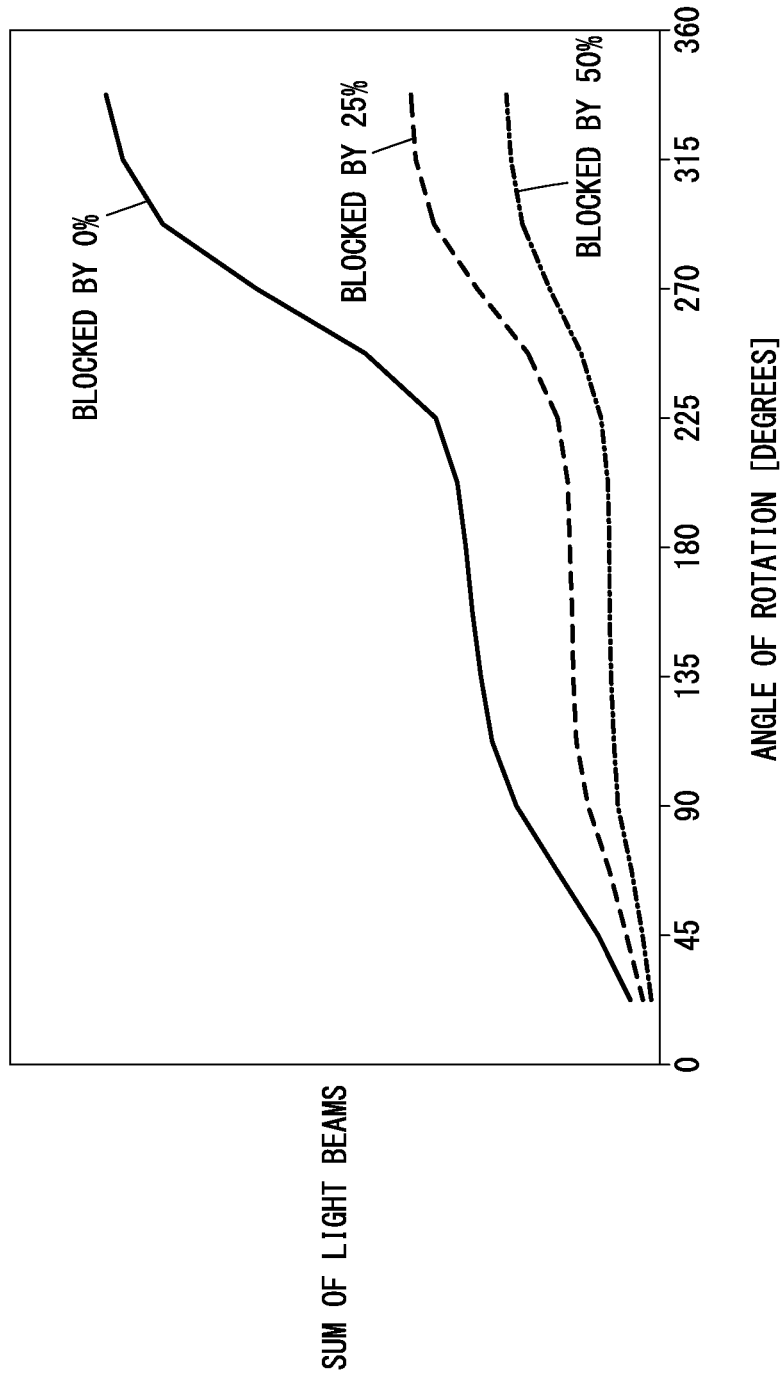
FIG. 11 is a diagram showing an example of a total sum of light beams received by a light receiving body.

FIG. 11 is a diagram showing an example of a total sum of the light beams received by the light receiving body. The horizontal axis in FIG. 11 represents the angle of rotation, and the vertical axis in FIG. 11 represents the sum of the light beams received by the light receiving body 14. In FIG. 11, there are shown an exemplary case in which the communication holes 36 are blocked by 0%, an exemplary case in which the communication holes 36 are blocked by 25%, and an exemplary case in which the communication holes 36 are blocked by 50%. As can be understood from FIG. 11, in the case that the communication holes 36 are blocked by 0%, the sum of the light beams received by the light receiving body 14 is sufficiently large. More specifically, in the case that the communication holes 36 are in a satisfactory state of opening, the sum of the light beams received by the light receiving body 14 becomes sufficiently large. On the other hand, as can be understood from FIG. 11, the more severely the communication holes 36 become blocked, the sum of the light beams received by the light receiving body 14 becomes smaller. The relationship between the degree of blockage of the communication holes 36 and the total sum of the light beams received by the light receiving body 14 can be obtained in advance by an actual measurement, a simulation, or the like. A table, a relational expression, and the like, which indicate the relationship between the degree of blockage of the communication holes 36 and the total sum of the light beams received by the light receiving body 14, can be stored beforehand in the storage unit 21. The determination unit 26 determines the open state of the communication holes 36, based on the table, the relational expression, and the like that are stored in the storage unit 21, and the total sum of the light beams received by the light receiving body 14.

Next, a description will be given with reference to FIG. 12 concerning operations of the communication hole inspection device 10 according to the present embodiment. FIG. 12 is a flow chart showing operations of the communication hole inspection device according to the present embodiment.

In step S11, the control unit 24 sequentially causes the light emitting body 12 to rotate, together with sequentially acquiring signals corresponding to the light beams received by the light receiving body 14. More specifically, the control unit 24 causes the light emitting body 12 provided in the light emitting modules 11 to emit light, and acquires signals corresponding to the light beams received by the light receiving body 14 provided in the light receiving modules 13. Thereafter, the control unit 24 changes the angle of rotation of the light emitting body 12 by a predetermined angular amount. The amount of change in the angle of rotation when the light emitting body 12 is rotated can be, for example, 10 degrees, however, the present embodiment is not limited to this feature. Next, the control unit 24 causes the light emitting body 12 provided in the light emitting modules 11 to emit light, and acquires signals corresponding to the light beams received by the light receiving body 14 provided in the light receiving modules 13. Thereafter, the control unit 24 changes the angle of rotation of the light emitting body 12 by a predetermined angle. The amount of change in the angle of rotation can be, for example, 10 degrees, however, the present embodiment is not limited to this feature. Thereafter, in a similar manner, the control unit 24 sequentially causes the light emitting body 12 to rotate, together with sequentially acquiring signals corresponding to the light beams received by the light receiving body 14. When the angle of rotation of the light emitting body 12 reaches, for example, 360 degrees, step S11 is brought to an end. Thereafter, the process transitions to step S12.

In step S12, the control unit 24 determines whether or not the angle of rotation of the light receiving body 14 has reached a predetermined angle. The predetermined angle can be, for example, 360 degrees, however, the present embodiment is not limited to this feature. In the case that the angle of rotation of the light receiving body 14 has not reached the predetermined angle (NO in step S12), the process transitions to step S13. In the case that the angle of rotation of the light receiving body 14 has reached the predetermined angle (YES in step S12), the process transitions to step S14.

In step S13, the control unit 24 causes the angle of rotation of the light receiving body 14 to be changed by a predetermined angular amount. The amount of change in the angle of rotation when the light receiving body 14 is rotated can be, for example, 10 degrees, however, the present embodiment is not limited to this feature. Thereafter, the processes from step S11 and thereafter are repeated.

In step S14, the control unit 24 calculates the sum of the signals corresponding to the light beams received by the light receiving body 14. Thereafter, the process transitions to step S15.

In step S15, the determination unit 26 determines the open state of the communication holes 36, based on the table, the relational expression, and the like that are stored in the storage unit 21, and the total sum of the light beams received by the light receiving body 14. In this manner, the process shown in FIG. 12 is brought to an end.

In the foregoing manner, the light beams may be sequentially received by the light receiving body 14 while the angle of rotation of the light emitting body 12 is sequentially changed, and the open state of the communication holes 36 may be determined based on the light beams sequentially received by the light receiving body 14.

Modified Embodiments

Although preferred embodiments of the present invention have been described above, they are not limited to the above-described embodiments, and various modifications are possible without departing from the essence and gist of the present invention.

For example, in the above-described embodiments, an exemplary case has been described in which the structural body 34 to be inspected is a cylinder head, however, the embodiments are not necessarily limited to this feature. Various castings, such as a water jacket provided on an outer periphery of an internal rotation type rotary motor is capable of being the object to be inspected.

The embodiments described above can be summarized in the following manner.

The communication hole inspection device (10) is configured to inspect the communication holes (36) of the structural body (34) having the casting surface formed on the inner surface thereof, the communication hole inspection device comprising the light emitting body (12) arranged in a portion of the communication holes and that emits the light beams, the light receiving body (14) arranged in a different portion of the communication holes and that receives the light beams, the rotation mechanism (53, 76A) that changes the light beams received by the light receiving body by changing the angle of rotation of the light emitting body, and the determination unit (26) that determines the open state of the communication holes, based at least on the light beams received by the light receiving body when the angle of rotation of the light emitting body is set to a first angle, and the light beams received by the light receiving body when the angle of rotation of the light emitting body is set to a second angle of rotation that differs from the first angle of rotation. In accordance with such a configuration, it is possible to provide the communication hole inspection device that is capable of satisfactorily determining the open state of the communication holes.

A plurality of the light receiving bodies may be provided with respect to one of the light emitting bodies. In accordance with such a configuration, it is possible to contribute to a reduction in cost.

The structural body may comprise the plurality of the communication holes, and the light emitting body and the light receiving body may be arranged with respect to each of the plurality of the communication holes. In accordance with such a configuration, the inspection can be completed in a short time, even in the case that the structure is equipped with a plurality of the communication holes.

The rotation mechanism (53) may be equipped with a link mechanism (54) that causes the plurality of the light emitting bodies to rotate. In accordance with such a configuration, it is possible to quickly inspect the open state of the communication holes.

The light beams may be sequentially received by the light receiving body while the angle of rotation of the light emitting body is sequentially changed, and the determination unit may determine the open state of the communication holes based on the light beams sequentially received by the light receiving body. In accordance with such a configuration, it is possible to satisfactorily and reliably inspect the open state of the communication holes.

The light emitting body may be axially supported on the rotating shaft (82), and there may further be provided the driving body (84) that causes the rotating shaft to rotate. In accordance with such a configuration, it is possible to satisfactorily and reliably inspect the open state of the communication holes.

The communication hole inspection method is characterized by a communication hole inspection method for inspecting the communication holes of the structural body having the casting surface formed on the inner surface thereof, the communication hole inspection method comprising the receiving step (step S2) of receiving the light beams emitted from the light emitting body arranged in a portion of the communication holes by the light receiving body arranged in another portion of the communication holes, the changing step (step S3) of changing the light beams received by the light receiving body by changing the angle of rotation of the light emitting body, and the determination step (step S5) of determining the open state of the communication holes, based at least on the light beams received by the light receiving body when the angle of rotation of the light emitting body is set to the first angle, and the light beams received by the light receiving body when the angle of rotation of the light emitting body is set to a second angle of rotation that differs from the first angle of rotation.

A plurality of the light receiving bodies may be provided with respect to one of the light emitting bodies.

The structural body may comprise the plurality of the communication holes, and the light emitting body and the light receiving body may be arranged with respect to each of the plurality of the communication holes.

In the changing step of causing the angle of rotation to change, the plurality of the light emitting bodies may be caused to rotate by a link mechanism that causes the plurality of the light emitting bodies to rotate.

The light beams may be sequentially received by the light receiving body while the angle of rotation of the light emitting body is sequentially changed, and in the determination step of determining the open state of the communication holes, the open state of the communication holes may be determined based on the light beams sequentially received by the light receiving body.

The light emitting body may be axially supported on the rotating shaft, and in the step of causing the angle of rotation of the light emitting body to change, the rotating shaft may be caused to rotate by a driving body that causes the rotating shaft to rotate.

The invention claimed is:
1. A communication hole inspection device configured to inspect a communication hole of a structural body having a casting surface formed on an inner surface thereof, the communication hole inspection device comprising:
- a light emitting body arranged in a portion of the communication hole and configured to emit a light beam;
- a light receiving body arranged in a different portion of the communication hole and configured to receive the light beam;
- a rotation mechanism configured to change the light beam received by the light receiving body by changing an angle of rotation of the light emitting body; and
- a determination unit configured to determine an open state of the communication hole, based at least on the light beam received by the light receiving body when the angle of rotation of the light emitting body is set to a first angle, and the light beam received by the light receiving body when the angle of rotation of the light emitting body is set to a second angle of rotation that differs from the first angle of rotation.

2. The communication hole inspection device according to claim 1, wherein a plurality of the light receiving bodies are provided with respect to one light emitting body.

3. The communication hole inspection device according to claim 1, wherein:
- the structural body comprises a plurality of the communication holes; and
- the light emitting body and the light receiving body are arranged with respect to each of the plurality of the communication holes.

4. The communication hole inspection device according to claim 3, wherein the rotation mechanism comprises a link mechanism that causes a plurality of the light emitting bodies to rotate.

5. The communication hole inspection device according to claim 1, wherein:
- the light beam is sequentially received by the light receiving body while the angle of rotation of the light emitting body is sequentially changed; and
- the determination unit determines the open state of the communication hole based on the light beams sequentially received by the light receiving body.

6. The communication hole inspection device according to claim 5, wherein:
- the light emitting body is axially supported on a rotating shaft; and
- further comprising a driving body configured to cause the rotating shaft to rotate.

7. A communication hole inspection method for inspecting a communication hole of a structural body having a casting surface formed on an inner surface thereof, the communication hole inspection method comprising:
- a receiving step of receiving a light beam emitted from a light emitting body arranged in a portion of the communication hole by a light receiving body arranged in another portion of the communication hole;
- a changing step of changing the light beam received by the light receiving body by changing an angle of rotation of the light emitting body; and
- a determination step of determining an open state of the communication hole, based at least on the light beam received by the light receiving body when the angle of rotation of the light emitting body is set to a first angle, and the light beam received by the light receiving body when the angle of rotation of the light emitting body is set to a second angle of rotation that differs from the first angle of rotation.

8. The communication hole inspection method according to claim 7, wherein a plurality of the light receiving bodies are provided with respect to one light emitting body.

9. The communication hole inspection method according to claim 7, wherein:
- the structural body comprises a plurality of the communication holes; and
- the light emitting body and the light receiving body are arranged with respect to each of the plurality of the communication holes.

10. The communication hole inspection method according to claim 9, wherein, in a changing step of causing the angle of rotation to change, a plurality of the light emitting bodies are caused to rotate by a link mechanism that causes the plurality of the light emitting bodies to rotate.

11. The communication hole inspection method according to claim 7, wherein:
- the light beam is sequentially received by the light receiving body while the angle of rotation of the light emitting body is sequentially changed; and
- in the determination step of determining the open state of the communication hole, the open state of the communication hole is determined based on the light beams sequentially received by the light receiving body.

12. The communication hole inspection method according to claim 11, wherein:
- the light emitting body is axially supported on a rotating shaft; and
- in the step of changing the angle of rotation of the light emitting body, the rotating shaft is caused to rotate by a driving body that causes the rotating shaft to rotate.

* * * * *